United States Patent

[11] 3,622,775

[72] Inventors Donald L. Ort
Brookside, N.J.;
Kenneth R. Carter, Woodland Hills, Calif.
[21] Appl. No. 873,891
[22] Filed Nov. 4, 1969
[45] Patented Nov. 23, 1971
[73] Assignee Litton Systems, Inc.
Beverly Hills, Calif.

[54] APPARATUS FOR DIRECTING AND POLARIZING LIGHT AND METHOD OF MAKING SAME
8 Claims, 5 Drawing Figs.

[52] U.S. Cl. ................................................. 240/9.5,
240/151, 350/147
[51] Int. Cl. ............................................................. F21
[50] Field of Search .......................................... 240/9.5,
7.5, 151; 261/1; 29/592; 350/147, 152, 156, 157;
353/27

[56] References Cited
UNITED STATES PATENTS
2,336,680 12/1943 Gillespie ........................ 350/156 UX
2,453,379 11/1948 Marks .......................... 240/9.5 X
2,519,387 8/1950 Marks ............................ 240/9.5
3,473,013 10/1969 Rodgers ......................... 240/9.5
3,508,809 4/1970 Wilder et al. ................... 350/157

*Primary Examiner*—Louis J. Capozi
*Attorneys*—Alan C. Rose, Ronald W. Reagin and Alfred B. Levine

ABSTRACT: An apparatus for directing and polarizing light comprising a unitary molded clear plastic support having an opening for a light bulb and a reflector placed about the bulb and having a sheet of polarizing material positioned about the opening in the plastic support so as to polarize the light from the bulb. A lens is formed in the periphery of the plastic support for collimating the light from the bulb. The method of making the apparatus comprises the steps of providing a mold, placing a polaroid sheet in proper position, introducing a hardenable resin, removing the molded piece and inserting a reflector and bulb into the molded piece.

PATENTED NOV 23 1971 3,622,775
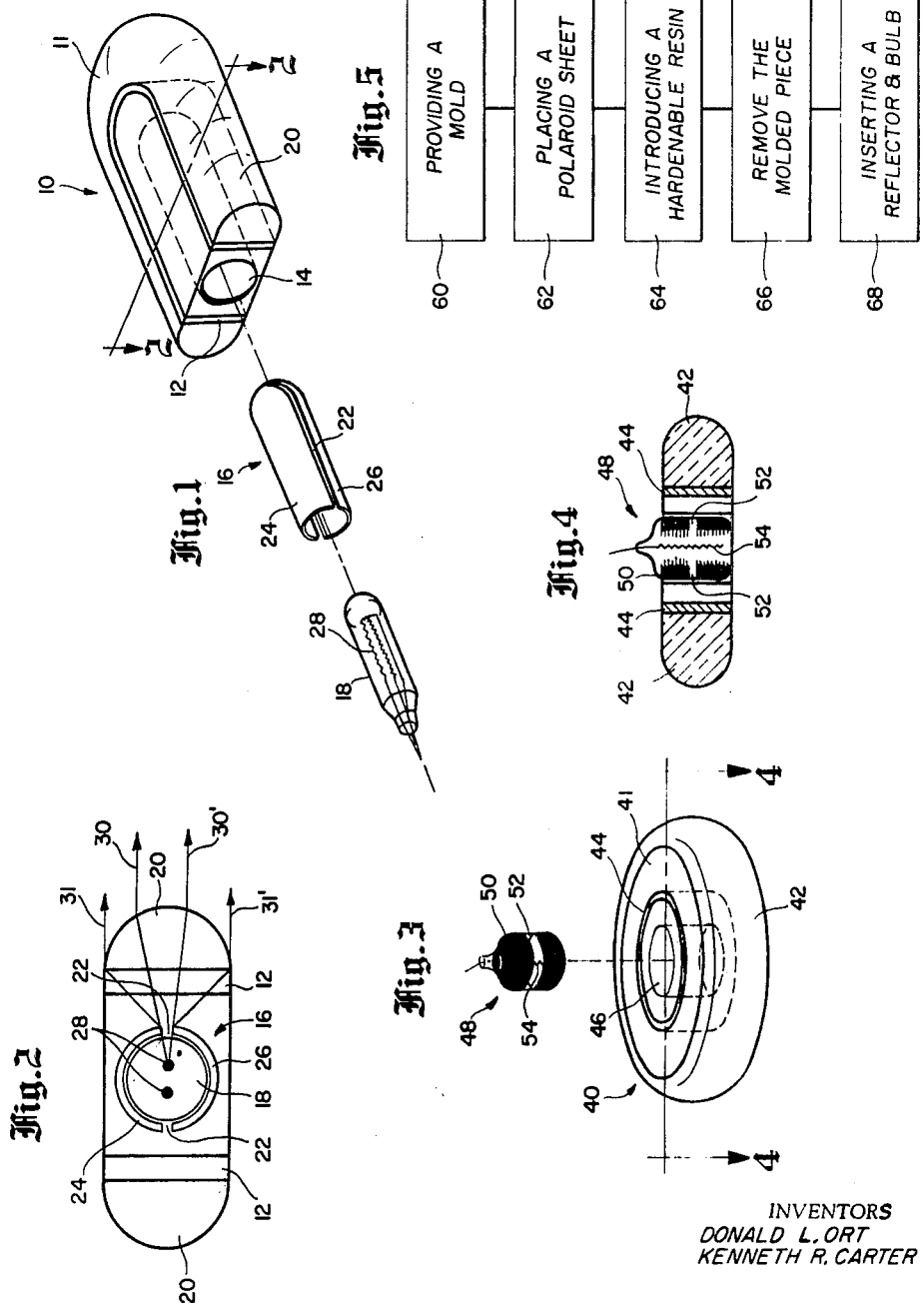
INVENTORS
DONALD L. ORT
KENNETH R. CARTER 3,622,775

APPARATUS FOR DIRECTING AND POLARIZING LIGHT AND METHOD OF MAKING SAME

BACKGROUND OF THE INVENTION

1. Field of the Invention

The present invention relates to a lighting apparatus and more particularly to a lighting apparatus which polarizes, intensifies and directs light from a light source and to the method of making such a lighting apparatus.

2. Description of the Prior Art

The present invention was conceived to solve problems which have been particularly bothersome to the aircraft industry. The challenge has been to develop a lighting apparatus for an aircraft instrument panel which will not create bothersome reflections and necessitate the use of equipment which in turn may cause other visual problems, and yet the lighting apparatus must be an economical one suitable for mass production.

It is to be noted that the present invention may have application not only in the aircraft industry but in the automotive industry and the boating industry in addition to the home, office and industrial lighting fields.

SUMMARY OF THE INVENTION

The problems of undesirable reflections, creation of blind spots and uneconomical equipment have been solved by the present invention which comprises in combination a polarizing element for polarizing light from a light source, a reflector for directing light positioned to partly surround the light source, means for supporting the polarizing means and the reflector in a position about a light source, and a lens for additionally directing light from the light source positioned and supported by the support means. The method of making the apparatus comprises providing a mold for forming the apparatus wherein the mold has provisions for forming an opening in the apparatus for receiving a light source and for forming a lens, locating a sheet of polarizing material in the mold, introducing a hardenable resin into the mold, removing the hardened resin from the mold, providing a light bulb, partly surrounding the light blubl with a light reflective material, and inserting the partly surrounded light bulb into the opening formed in the hardened resin. In a preferred embodiment the apparatus comprises a unitary molded plastic piece with a centrally located opening, a sheet of polarizing material embedded within the plastic piece and positioned around the opening and as part of the unitary plastic piece a rounded periphery which forms a focusing lens. Within the opening formed the unitary plastic apparatus receives a light bulb which may be coated with reflective material or surrounded by a reflective material, in either case a slit opening is provided so that light from the bulb can be transmitted only through the slit opening, all the light being reflected internally until it is able to be transmitted through the slit opening.

An object of the present invention is to provide an economical, simply con :cted apparatus for directing, intensifying and polarizing light from a light source.

Another object of the present invention is to provide an economical method of manufacturing an apparatus for directing, intensifying and polarizing light from a light source.

BRIEF DESCRIPTION OF THE DRAWING

FIG. 1 is a partially exploded perspective view of a preferred embodiment of the present invention.

FIG. 2 is an enlarged unexploded section view taken along line 2—2 of FIG. 1.

FIG. 3 is a partially exploded perspective view of another preferred embodiment of the present invention.

FIG. 4 is an unexploded section view taken along line 4—4 of FIG. 3.

FIG. 5 is a diagrammatic illustration of the method of making a preferred embodiment of the present invention.

DESCRIPTION OF THE PREFERRED EMBODIMENTS

Referring now to the drawing wherein like numerals designate like or corresponding parts throughout the several views, there is shown in FIG. 1 a lighting apparatus 10 having a unitary transparent plastic support 11 which has embedded within it an element for polarizing light such as a sheet of Polaroid 12. A central longitudinal opening 14 is provided in the support 11 for the purpose of receiving a reflector 16 and a light source such as a light bulb 18. A lens 20 is disposed about the support periphery and formed as a unitary part of the support at the time the support is molded.

The overall shape of the apparatus 10 is similar to a halved ellipsoid or to a tongue. The opening 14 extends generally longitudinal to the apparatus 10 while the sheet of Polaroid 12 extends in a U-shaped fashion generally parallel to the peripheral lens 20 and about a portion of the opening 14. The reflector 16 is similar to a cylinder or hollow finger so as to conform to the opening 14. Extending along the reflector 16 in a longitudinal direction is a slit opening 22 which is generally U-shaped so that the reflector 16 is effectively separated into two portions, an upper portion 24 and a lower portion 26. The portions 24 and 26 are positioned within the opening 14 to position the slit opening 22 parallel to the sheet of Polaroid 12. Thus, when the light bulb 18 is positioned within the opening 14 and is operative, the reflector 16 will allow light to pass only through the slit opening 22. By restricting the emitting portion of the bulb and reflecting all other light, that light passing through the slit is more intensified than would be the case without the reflector. The light is then directed through the Polaroid sheet 12 and then to and through the lens 20. The shape of the opening 14 may be varied to help direct the light as may be the external surface of the lens 20. If desired, the polarizing material may be positioned to essentially parallel and be adjacent to the sides of opening 14.

The light bulb may be of any suitable type such as that manufactured by the Chicago Miniature Company, No. 2182, having a diameter of 0.220 inch and having a U-shaped filament 28 which is positioned parallel to the slit opening 22 and the Polaroid sheet 12. The reflector 16 may be of any polished material and preferably is polished aluminum or nickel of sufficient thickness to be easily shaped and yet having an ability to retain the formed shape during handling of a manufacturing operation; the reflector may be constructed in one, two or more pieces depending upon convenience. A thickness of 0.003 to 0.005 inch has been found suitable though, of course, the thickness dimension is mainly a function of space requirements and bulb diameter. The plastic support 11 may be of any transparent resin such as polyester or epoxy which are classified as thermoplastics or thermosetting plastics. A dye may be introduced into the plastic if it is desired to color the emitted light; i.e., so as to emit a red or a blue-white light. The support can be also molded from glass, in which case the most economical manufacturing method would involve molding the apparatus in several sections and cementing the sections together after properly placing the polarizing material.

OPERATION

Referring now to FIG. 2 there is shown the light bulb 18 with two portions of the filament 28, the upper portion 24 and the lower portion 26 of the reflector 16, the Polaroid sheet 12, the slit opening 22 and the lens 20.

Lines 30 and 30' are drawn to designate the limits of light rays emanating directly from the filament 28 that are able to pass through the slit 22, while lines 31 and 31' are drawn to designate the limits of light rays which emanate from the filament but which are reflected by the reflector 16 before being transmitted through the slit 22. As is clearly seen all the light which passes through the slit 22 will also pass through and be polarized by the Polaroid sheet 12. The light is then collimated by the lens 20 so that a relatively concentrated, well directed beam of light is available for use. In the preferred embodiment where the apparatus 10 may be used to provide light for instruments in an aircraft instrument panel, and where the bulb diameter is 0.220 inch, it has been found that the angle between the lines 30 and 30' which may be used to define the slit width is approximately 34°.

Referring now to FIGS. 3 and 4, there is illustrated another preferred embodiment of the present invention. The apparatus 40 is comprised of a unitary molded plastic support 41 having a lens 42 formed along the outer periphery. Concentric with the lens 42 but having a smaller diameter is a polarizing material such as a sheet of Polaroid 44 which is in the form of a ring. Concentric with both the lens 42 and the Polaroid sheet 44 is an opening 46 into which a light bulb 48 is located. The light bulb may have a reflector similar to that described in the FIG. 1 embodiment or the light bulb may be coated, as illustrated, with a reflective material 50 such as aluminum or the reflective material may be painted on the bulb. Vacuum disposition techniques for coating glass are well known among those companies manufacturing mirrors; such techniques may be used to coat the light bulb. The reflective material 50 or reflector (not shown) is positioned to leave a slit opening 52 as illustrated in a horizontal position about the light bulb 48. As is more clearly shown in FIG. 4, a filament 54 is centrally located parallel to the longitudinal axis of the bulb 48. It is noted that the bulb filament configuration is not critical for either the FIG. 1 or FIG. 3 embodiments. However, to optimize the light collimation the lens should be designed for the particular filament shape and position to be utilized as exemplified by the FIG. 1 and FIG. 3 embodiments.

A review of FIG. 4 will indicate that a ray diagram (not shown) similar to that illustrated in FIG. 2 may be drawn and would indicate a result similar to that discussed above in relation to FIG. 2. However, the FIG. 3 embodiment has the added advantage of providing light subtending an angle of 360°.

In both the FIG. 1 and FIG. 3 embodiments the light which emanates from the apparatus is polarized depending upon the orientation of the Polaroid sheets 12 and 44 respectively. For example, it is known that light which is reflected from a glass or plastic surface such as an instrument lens is polarized, i.e., linearly polarized. Once the environment is known for the lighting apparatus, the Polaroid sheets may be selectively oriented to remove that light which would be reflected from the glass or plastic surface so that after a beam of light is passed through the Polaroid sheet and reflected off the surface most of the light has been essentially blocked so that for practical purposes most reflected light has been eliminated.

A fuller discussion of this phenomena is presented in a copending application, Ser. No. 873,928 filed Nov. 4, 1969, titled "Lighting System for Instruments" and assigned to the assignee of the present application.

METHOD

Referring now to FIG. 5 there is illustrated in diagrammatic form the method of making a preferred lighting apparatus. The first step 60 comprises providing a mold which has provision for forming an opening such as the opening 14, FIG. 1 or the opening 46, FIG. 3 for receiving a light source such as a light bulb. The next step 62 comprises placing a sheet of polarizing material such as Polaroid in the mold positioned so as to substantially surround the opening as in FIGS. 1 and 3. The following step 64 includes the molding operation during which a hardenable resin or thermoplastic is introduced into the mold such as by casting or by injection so that the resin flows about the sheet of polarizing material. As mentioned, the resin may be a polyester or epoxy. After the resin has hardened the molded lighting apparatus is removed 66 from the mold. To complete a lighting device a further step 68 of inserting a reflector and light bulb (or light bulb coated with a reflective material) is accomplished to provide an embodiment analogous to that shown in FIGS. 1 and 3. It is to be noted that in order to prevent a bothersome air gap in the slit 22, FIG. 2, and thus prevent refraction as the light passed from the bulb through the airgap and then through the resin, additional resin may be used in the slit 22. The reflector and light bulb may be integrally molded within the assembly. This provides the additional benefits of lower cost assembly, permanent and accurate placement of the bulb filament and reflector and elimination of any airspaces around the bulb or reflector.

A further embodiment may be visualized by referring to FIGS. 1 and 2. The surface of the opening 14 (FIG. 1) adjacent the slit 22 may be shaped to provide a convex lens (not shown). In this situation an air space within the slit 22 is desirable so that the refractive properties of the convex lens may be fully utilized. The convex lens and lens 20 may be of any shape, i.e., planar, to provide the desired light directing properties.

What is claimed is:

1. An apparatus for directing and polarizing light rays from a light source, comprising in combination:
   unitary molded support means having an opening therein for receiving and mounting said light source;
   reflector means positioned between said light source and said unitary molded support means within said opening for reflecting light rays from said light source;
   polarizing means molded within said unitary molded support means for receiving said reflected light rays from said reflector means; and
   said unitary molded support means molded to form lens means for directing said polarized light rays from said polarizing means.

2. An apparatus for directing and polarizing light rays from a light source, as claimed in claim 1, wherein:
   said reflector means encloses and surrounds said light source from opposite sides thereof for forming a plane through which said light rays are reflected;
   said polarizing means molded within said unitary support means surrounds said light source and said reflector means and is perpendicular to said plane through which said light rays are reflected; and
   said lens means molded into said unitary molded support means parallelly surrounds and conforms to the shape of said polarizing means.

3. Apparatus for directing and focusing light rays from a light source, comprising:
   unitary support means molded about said light source and supporting said source;
   reflector means supported by said unitary support means surrounding said light source from opposite sides thereof for forming a light ray directing plane about said source through which said light rays are directed;
   said unitary support means having an outer periphery molded to form lens means located within the light ray directing plane formed by said reflector means for focusing said light rays directed within said plane.

4. Apparatus for directing and focusing light rays from a light source as claimed in claim 3, additionally comprising:
   polarizing means molded into said unitary support means surrounding said light source and perpendicular to said light ray directing plane for polarizing said light rays prior to said focusing thereof.

5. Apparatus for directing and focusing light rays from a light source as claimed in claim 4, additionally comprising:
   said unitary support means molded into a generally halved elliptical shape having an axis passing perpendicularly through the plane that halved said elliptical shape;
   said light source supported within a space passing through said axis;
   said polarizing means molded into said unitary support means in a general U-shape surrounding said mounting space; and
   said light ray directing plane arranged perpendicularly to said plane that halved said elliptical shaped support means.

6. Apparatus for directing and focusing light rays from a light source as claimed in claim 4, additionally comprising:
  said unitary support means molded into a generally toroidal shape about an opening within the center axis thereof;
  said light source supported within said opening;
  said polarizing means molded into said unitary support means in a general ring shape surrounding said opening; and
  said light ray directing plane arranged perpendicularly to said center axis.

7. Apparatus for directing and focusing light rays from a light source as claimed in claim 3, wherein:
  said reflector means surrounding said light source is formed from separate halves of a tubular shield split to form said light ray directing plane.

8. Apparatus for directing and focusing light rays from a light source as claimed in claim 3, wherein:
  said reflector means surrounding said light source is formed by opaque coating means upon said light source to prevent the emission of light rays therefrom in all areas but said light ray directing plane.

* * * * *